Oct. 17, 1961  J. D. POISKER  3,004,550
GAS STOP
Filed Nov. 5, 1959  2 Sheets-Sheet 1

INVENTOR
JOHN D. POISKER
BY
Cameron, Kerkam & Sutton
ATTORNEYS

Oct. 17, 1961　　　J. D. POISKER　　　3,004,550
GAS STOP
Filed Nov. 5, 1959　　　2 Sheets-Sheet 2
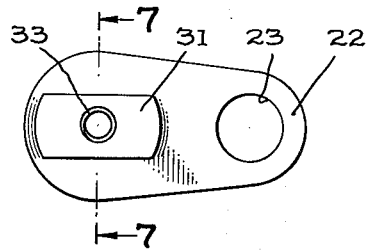
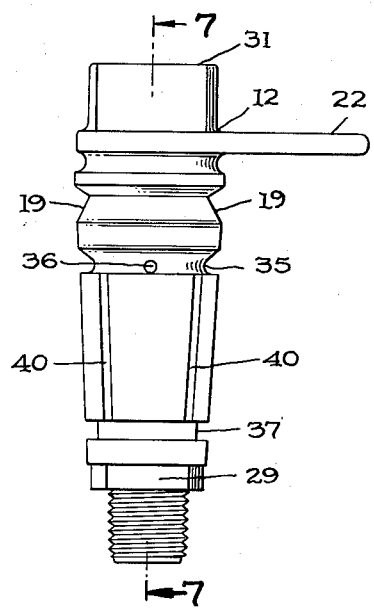
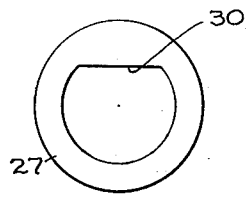
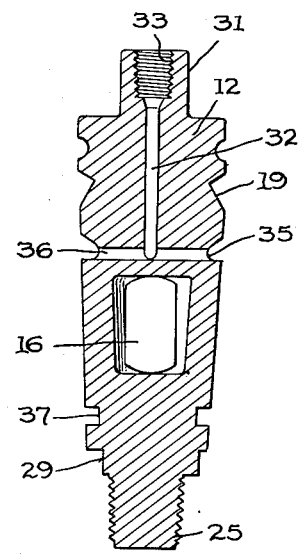
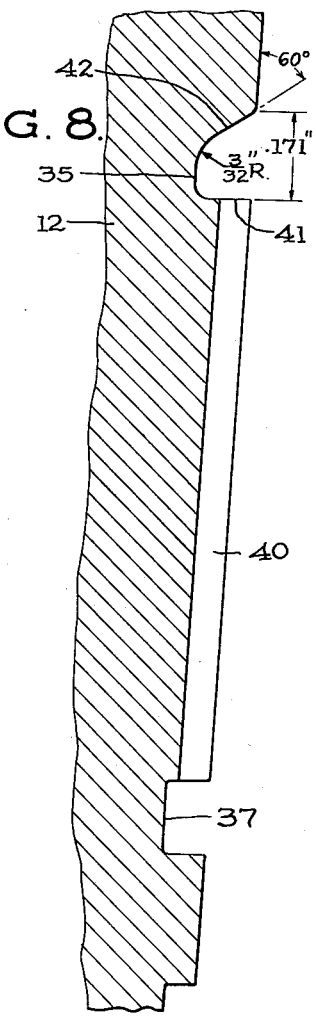
INVENTOR
JOHN D. POISKER
BY Cameron, Kerkam + Sutton
ATTORNEYS

United States Patent Office 3,004,550
Patented Oct. 17, 1961

3,004,550
GAS STOP
John D. Poisker, Souderton, Pa., assignor to The Welsbach Corporation, Philadelphia, Pa., a corporation of Delaware
Filed Nov. 5, 1959, Ser. No. 851,171
1 Claim. (Cl. 137—246.15)

This invention relates to gas stops and more particularly to gas stops of the plug valve type. More particularly this invention relates to lubricated gas stops in which lubricant is forced between the valve key and the valve body.

Heretofore various lubricated plug valves have been suggested but difficulty has been experienced in providing for the admission of lubricant to the surfaces of the key and the surface of the valve body receiving the key while preventing leakage of high pressure gas from the valve.

The present invention provides a novel structure for supplying lubricant between the surface of the key and the corresponding surface of the valve body while preventing loss of gas from the valve by leakage between the valve key and the valve body.

It is accordingly an object of the present invention to provide a novel gas stop or plug valve which can be lubricated while in line service.

Another object is to provide such a valve in which loss of lubricant is reduced to a minimum.

Another object is to provide such a valve in which the lubricant is uniformly distributed over the surface of the valve key and over the corresponding surface of the valve body.

Another object is to provide such a valve in which means are provided for distributing lubricant to the entire surface of the valve key while the valve key is in any desired position with respect to the valve body.

Another object is to provide such a valve in which the valve key has spaced circumferential grooves of novel shape supporting O rings which permit lubricant to enter the grooves while preventing loss of high pressure gas.

Other and further objects of the present invention will appear from the following description of an illustrative embodiment thereof.

The novel gas stop of the present invention is capable of various mechanical embodiments one of which is shown in the accompanying drawings and is described hereinafter to illustrate the invention. This illustrative embodiment of the invention should in no way be construed as defining or limiting the invention.

In the accompanying drawings, in which like reference characters designate like parts:

FIG. 4 is an elevational view of the valve key of FIG. 1;

FIG. 5 is a view from above of the valve key of FIG. 4;

FIG. 6 is a view of the washer shown in cross-section in FIG. 1;

FIG. 7 is a cross-sectional elevation of the valve key of FIG. 4; and

FIG. 8 is an enlarged detail in section of a part of the valve key of FIG. 4.

Figure 1:
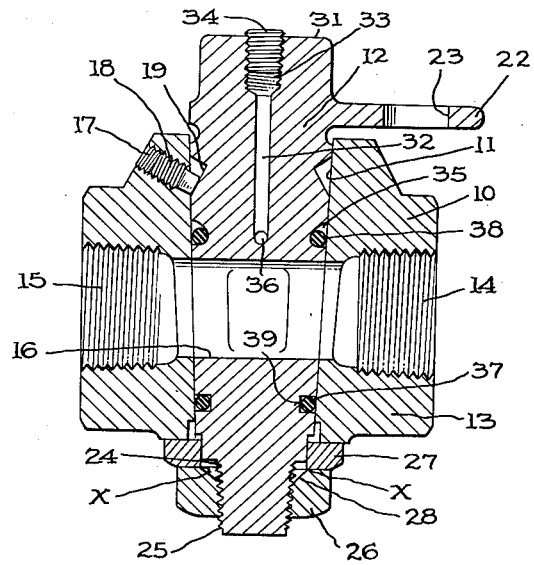
FIG. 1 is a sectional elevation of an illustrative embodiment of a gas stop or plug valve in acordance with the present invention.
Figure 3:
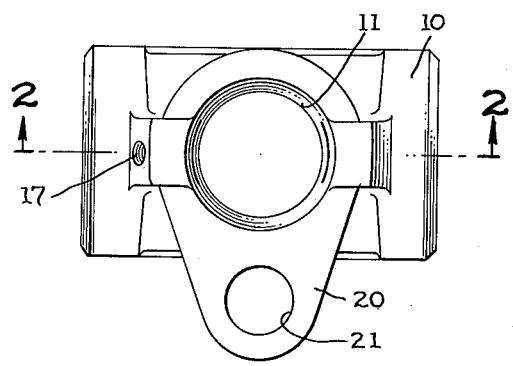
FIG. 3 is a view from above of the valve body of FIG. 1 with the valve key removed.
Figure 2:
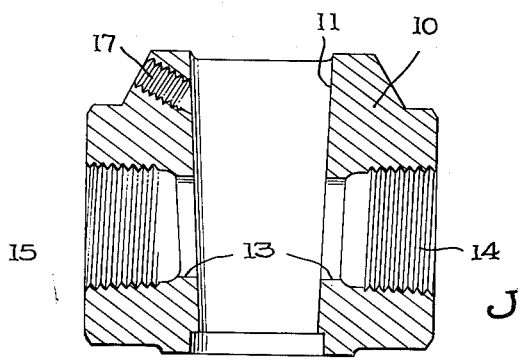
FIG. 2 is a cross-sectional elevation of the valve body of FIG. 1 with the valve key removed.

Referring now to the several figures and more particularly to FIGS. 1, 2 and 3, 10 is any suitable valve body provided with a conically shaped bore 11 therethrough to receive correspondingly tapered valve key 12.

Body 10 is throughbored at 13 and bore 13 is threaded at 33 to receive threaded plug 34. A circumferential 12 is correspondingly bored at 16 so that when bores 13 and 16 are aligned by proper positioning of key 12 gas flows freely through the valve.

Body 10 is suitably bored and internally threaded at 17 to receive bolt 18 which co-acts with surface 19 formed in key 12 to hold key 12 in position in valve body 10. After insertion of bolt 18 bore 17 may be filled with suitable material to prevent unauthorized tampering with the valve.

Valve body 10 may be provided with outstanding flange 20 which is provided with a suitable aperture 21 and valve key 12 may be provided with tongue 22 having a suitable aperture 23. When the valve is in closed position apertures 21 and 23 are in aligned position and the valve may be locked closed by inserting a suitable locking device therein.

Valve key 12 is reduced in diameter at 24 and is threaded at 25 to receive nut 26 which is threaded thereon and co-operates with washer 27 to hold key 12 in body 10. Nut 26 may be dished at 28 to collect any grease seeping past the lower O ring to be hereinafter described.

Valve key 12 may be provided with a flattened surface 29 which receives a flattened surface 30 on washer 27 so that washer 27 will rotate with valve key 12 (FIG. 6).

As seen in FIG. 5, valve key 12 may be provided with an upstanding lug 31 to receive a wrench for rotating the valve key to desired position.

Valve key 12 is axially bored at 32 and bore 32 is enlarged adjacent its upper end and internally threaded at 33 to receive threaded plug 34. A circumferential groove 35 of critical configuration is formed in valve key 12 above bore 16. Radial passages 36 open communication between the lower end of bore 32 and groove 35. A second circumferential groove 37 is provided in key 12 below bore 16. O rings 38 and 39 are mounted in grooves 35 and 37, respectively.

As seen in FIG. 4, the face of valve key 12 between grooves 35 and 37 is provided with a plurality of lubricant grooves 40 extending between O ring grooves 35 and 37.

When the gas stop or plug valve of the present concept is assembled, as shown in FIG. 1, lubricant may be forced into bore 32 of key 12 and will pass outwardly through radial passages 36 into groove 35 lifting O ring 38 upwardly to prevent leakage of lubricant in an upwardly direction out of the valve and lubricant will pass downwardly through grooves 40 to lubricate the contact surfaces of key 12 and body 10. O ring 39 will prevent leakage of lubricant out of the bottom of the valve.

O rings 38 and 39 also prevent the escape of high pressure gas from the valve and this is accomplished by designing grooves 35 and 37 so that O rings 38 and 39 bear against the surface of bore 11. Referring particularly to FIG. 8, the critical shape of groove 35 will be noted. Groove 35 has bottom 41 which extends at approximately 90° to the adjacent surface of bore 11 and the top of groove 35 is curved as at 42 to intersect the adjacent surface of bore 11 at approximately 60°. For a gas stop or plug valve having 1/8" diameter O rings 38 and 39 it has been found that the following relative dimensions of groove 35 are critical. The radius of curvature of the top of groove 35 must be 3/32 of an inch; the angle between the adjacent surface of bore 11 and surface 42 of groove 35 must be 60° and the height of groove 35 must be .171 inch. When groove 35 has these critical dimensions O ring 38 bears equally against the top of groove 35, i.e., surface 42, and against the adjacent surface of bore 11.

It has been found that if one or more of these critical relationships for grove 35 are ignored lubricant is forced over the top of O ring 38 wasting lubricant and inefficiently distributing lubricant to other parts of the key. Gas leaks then also occur.

The plug valve or gas stop shown in in FIG. 1 when assembled and lubricated and with grove 35 having the critical dimensions described above has been tested both in the laboratory and in the field for all positions of key 12 with respect to body 10 at pressures of 300 pounds per square inch and no gas leakage has been noted. After testing the plug valve has been carefully disassembled and upon examination it has been found that lubricant was evenly distributed over all bearing surfaces between key 12 and bore 11 with no leakage of lubricant past O ring 38 and with no leakage of lubricant from the bottom of the valve. Lubricant was evenly distributed through grooves 40 and passages 36.

It should now be apparent that the present invention in every way satisfies the several objectives described above.

Changes in or modifications to the above described illustrative embodiment of this invention may now be suggested to those skilled in the art without departing from the present inventive concept. Reference should therefore be had to the appended claim to determine the scope of this invention.

What is claimed is:

In a plug valve including a valve body with a tapered opening therein, a through passage at right angles to the opening and a tapered valve key mounted for engagement with the surface of and for rotation in the opening, the valve key having a through passage for registration with the passage in the valve body, a circumferential groove in the key above the passage therein, lubrication conduits in the key communicating with said groove, a second circumferential groove in the key below the passage therein, lubrication grooves in the surface of the key between and opening into the circumferential grooves and an O ring mounted in each of the circumferential grooves in engagement with the key and with the adjacent surface of the tapered opening in the valve body, the improvement in which the first circumferential groove has a lower surface meeting the adjacent surface of the tapered opening in the valve body at approximately 90°; has a curved upper surface meeting the adjacent surface of the tapered opening in the valve body at approximately 60°; and has relative dimensions based upon the diameter of the O ring of a top curvature of 3/32 of an inch radius and .171 inch height of the groove for a 1/8 inch diameter O ring.

References Cited in the file of this patent

UNITED STATES PATENTS

| | | |
|---|---|---|
| 2,296,649 | Mueller | Sept. 22, 1942 |
| 2,481,482 | Green | Sept. 13, 1949 |
| 2,708,096 | Mueller | May 10, 1955 |
| 2,829,668 | Mueller | Apr. 8, 1958 |

FOREIGN PATENTS

| | | |
|---|---|---|
| 1,087,039 | France | Oct. 18, 1954 |

UNITED STATES PATENT OFFICE
CERTIFICATE OF CORRECTION

Patent No. 3,004,550                          October 17, 1961

John D. Poisker

It is hereby certified that error appears in the above numbered patent requiring correction and that the said Letters Patent should read as corrected below.

Column 2, line 2, for "33 to receive threaded plug 34. A circumferential" read -- 14 and 15 to receive the gas pipe or line. Valve key --.

Signed and sealed this 3rd day of April 1962.

(SEAL)
Attest:

ERNEST W. SWIDER                          DAVID L. LADD
Attesting Officer                            Commissioner of Patents